Figure 1:
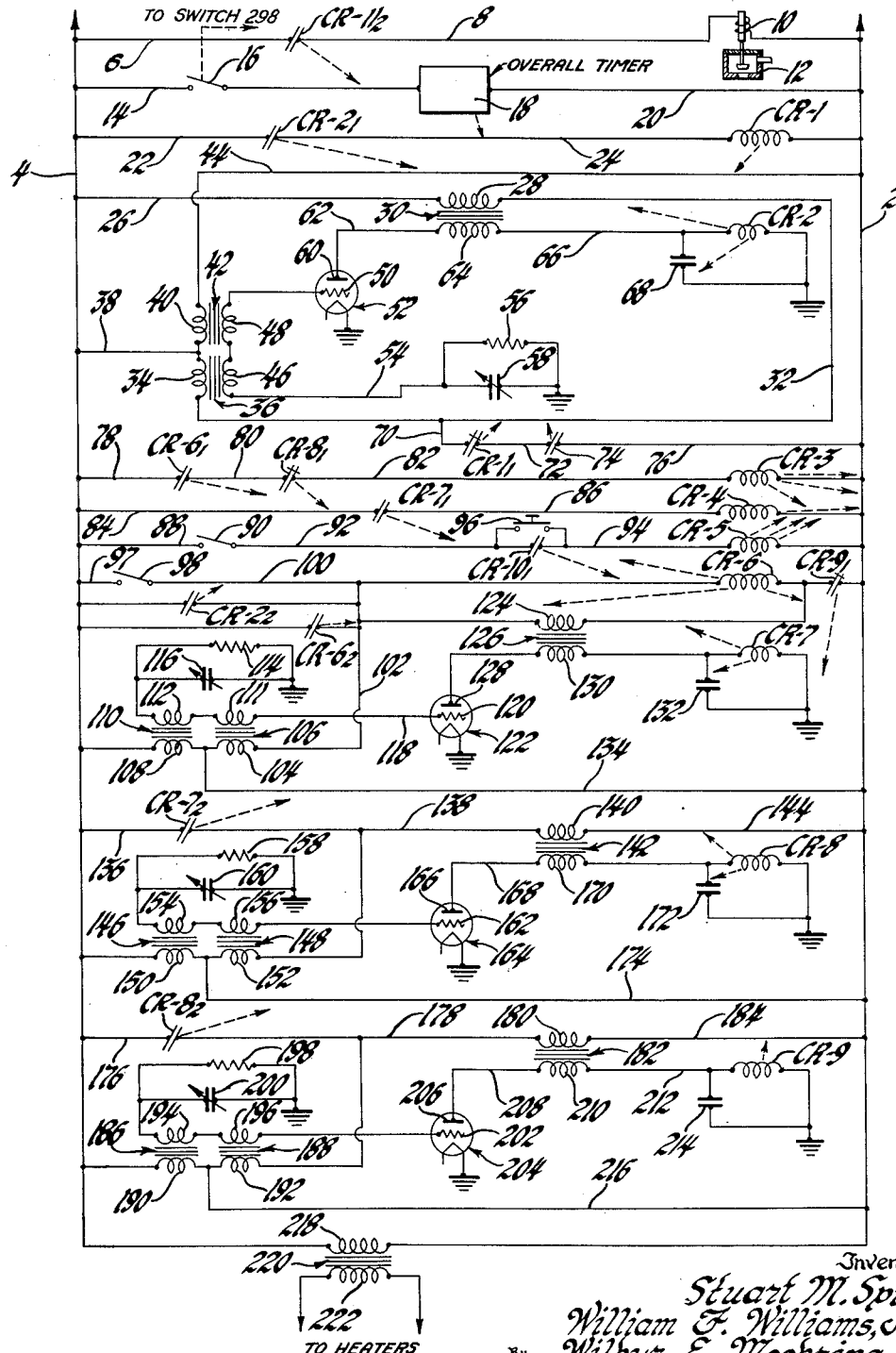

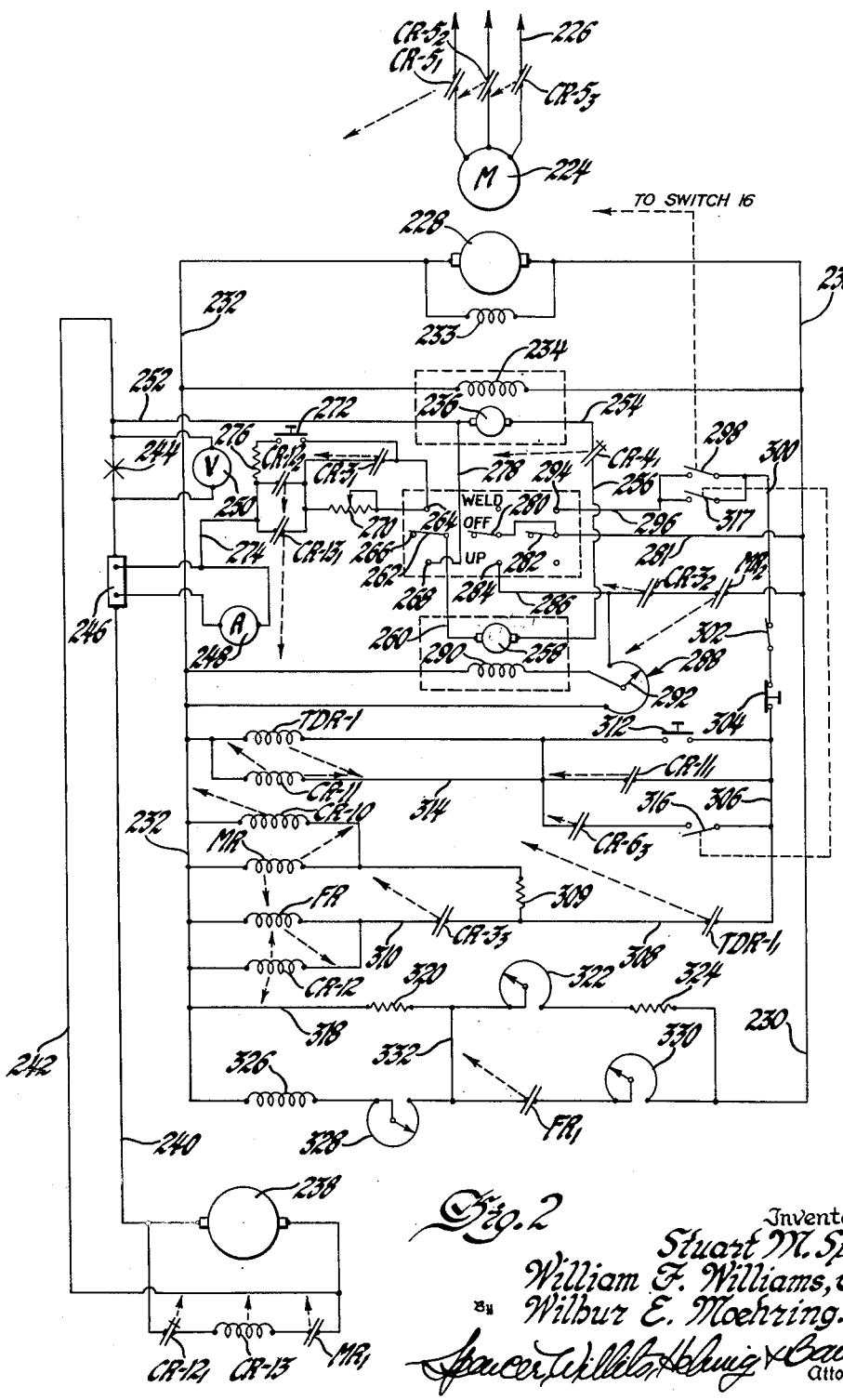

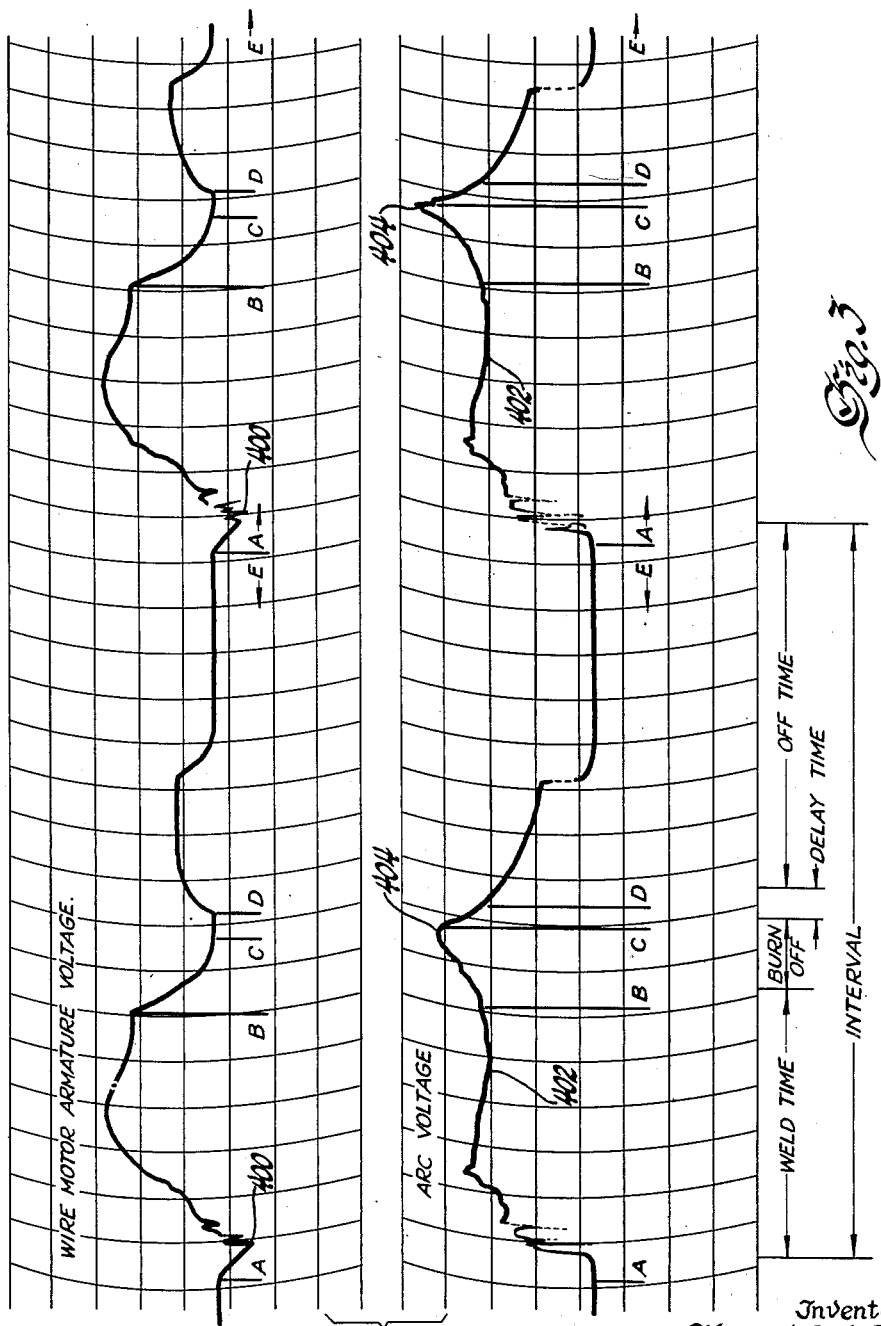

Patented Apr. 14, 1953

2,635,165

UNITED STATES PATENT OFFICE 2,635,165

SKIP WELDING CONTROL

Stuart M. Spice, William F. Williams, Jr., and Wilbur E. Moehring, Flint, Mich., assignors to General Motors Corporation, Detroit, Mich., a corporation of Delaware Application March 3, 1949, Serial No. 79,462

12 Claims. (Cl. 219—8)

This invention relates to welding control means and more specifically to a compound control system for actuating a submerged melt intermittently or what might be termed a skip welding process. Various types of equipment have been common for continuously welding two parts together which are in juxtaposition over a relatively long distance. For example, during war production large metal sheets were welded together by various means including submerged arc welding, which sheets were in juxtaposition for some considerable distance, along the junction line of which the two were to be welded together. As long as the parts themselves were relatively heavy or thick in section, the amount of heat introduced into the same from welding was not injurious, but where the sections became thinner and the parts large in area in comparison to their thickness, the introduction of localized heating from welding was found to have injurious effects such as warping or twisting. As an example of such a disadvantage or difficulty, if it were desired to secure to a relatively thin disc or plate a toothed rim of considerably thicker section by welding, and the inner edge of the rim were to be welded to the flanged periphery of the disc or plate, the heat from said continuous weld might readily be sufficient to warp the plate so that the combined resulting wheel would not be flat, but would be warped or wavy. In order to alleviate such difficulties and to still secure parts together, a discontinuous or skip welding method was tried so that along the total length of the juxtaposed parts, instead of having a continuous long weld, a series of spaced short welds would be used. This method was utilized to secure a relatively thick toothed rim to a flanged disc plate and it was found that the reduction in total heat, as well as the spaced heated intervals, was sufficient to spread out the heating and to reduce the same so that there was no appreciable warpage of the resulting wheel.

In order, however, to provide an automatic system of this type, it is, of course, necessary to provide control means for causing relative motion between the parts to be welded together and the welding electrode, feeding the electrode toward the work at proper times and proper speeds and then discontinuing said feeding, and to control the voltage or power between the electrode and the work at certain predetermined time intervals.

It is, therefore, an object of our invention to provide a welding control system for producing a series of discontinuous spaced welds at the junction plane of parts to be secured together.

It is a further object of our invention to provide control means for feeding an electrode with respect to the work and controlling the timed voltages thereon to, in the end result, provide a series of intermittent skip welds to secure two parts together.

It is a further object of our invention to provide control means for feeding the electrode with respect to the work at different rates at different timed portions of the operating cycle.

It is a further object of our invention to provide such a control circuit that the welding current between the welding electrode and the work is maintained for a short period of time following the cessation of electrode feed to burn off the electrode to prevent sticking.

It is a still further object of our invention to provide a control system which is adjustable to provide different lengths of weld to accommodate different circumstances of securing by welding.

It is a still further object of our invention to provide a control circuit in which timing means is provided for the individual welds as well as an overall control time for the whole operation.

With these and other objects in view which will become apparent as the specification proceeds, our invention will be best understood by reference to the following specification and claims and the illustrations in the accompanying drawings, in which:

Figure 1 discloses a schematic wiring diagram showing a portion of the control circuit of our invention;

Figure 2 shows a schematic wiring diagram of the remainder of the control system of our invention, the two parts of the system cooperating together to provide the complete control; and Figure 3 is an oscillograph chart showing the simultaneous voltages in the wire feed motor armature and across the arc.

It will become evident as the specific disclosure proceeds that there are a number of different relay coils which control one or more sets of relay contacts which, for purposes of clarification in the drawings, are shown at a point removed from the operating coil, and in order to clearly and simply define each coil with its operated contacts, they will be hereinafter referred to by the same reference characters but with subnumerals. For example, assuming that a relay coil operated a plurality of contacts, the relay coil per se will be identified, for example, as CR–1, whereas the contacts operated thereby will be referred to as CR-1₁ and CR-2₂. Further, in order to assist the identification of the contacts with their operating coil, dash and dotted arrow lines have been drawn from the operating coil in the direction of its operated contacts and the number of arrows emanating from any one coil indicates the number of contacts operated.

Referring now more specifically to said drawings, in Figure 1 there is shown a pair of main supply lines 2 and 4, which are connected to the ordinary 110 volt A. C. plant power. First in order from the upper portion of the drawings connected between these lines are a pair of relay contacts designated CR-1₁₂, one contact of which is connected to line 4 through line 6, the other contact being connected through line 8 to operating solenoid coil 10 and thence to the other supply line 2. The solenoid coil 10 is the operator for an air valve 12 which controls the feed of the flux in this instance used to submerge the arc. This flux is maintained in a hopper not shown and fed down to the approximate position of the portion to be welded at the time the arc is drawn. In other words, when the relay contacts CR-1₁₂ are closed, and they are shown normally open, the flux will feed to the work. A line 14, likewise connected to the main buss 4, extends to the primary on/off switch 16, which is in turn connected to an overall timer 18, for controlling the time of a complete welding operation to secure two parts together, the opposite terminal of which is connected through line 20 to main line 2. When the on/off switch 16 is closed, therefore, the timer begins to operate and will continue to time the definite interval at the end of which the two parts are secured together by a plurality of skip welds and, through certain means to be described, it will deenergize the system.

Conductor 22, extending from main line 4, is connected to normally open relay contacts CR-2₁ and the opposite terminal thereof is connected through line 24 to one end of relay coil CR-1, whose opposite end terminates at main line 2. Conductor 26 extends from main line 4 through the primary 28 of transformer 30, the opposite terminal of which is connected through line 32 to one side of primary 34 of transformer 36, and thence through line 38 back to main line 4. Line 38 is also connected to one end of primary 40 of transformer 42, the opposite side being connected through conductor 44 to main line 2. The secondary 46 of transformer 36 is connected in series with secondary 48 of transformer 42, the latter being connected directly to the control grid 50 of a triode tube 52. The secondary 46 is likewise connected through conductor 54 to an "interval" timer circuit consisting of a resistor 56 in parallel with a variable condenser 58, the opposite terminal of which is grounded. Thus, by varying the capacitor 58, the RC characteristics are varied and the time period of the system is changed. The plate 60 of the control tube 52 is connected through line 62 to secondary 64 of transformer 30 and thence through line 66 to relay coil CR-2, the opposite terminal of which is grounded. The capacitor 68 is connected in parallel around coil CR-2. Conductor 70 is connected between line 32 and normally closed contacts CR-1₁, the opposite contact being connected through line 72 to a pair of normally open contacts 74, operated by the overall timer 18. These contacts are likewise connected through line 76 to main line 2.

Next in order is a control line for relay CR-3 and consists of conductor 78 connected to normally open relay contacts CR-5₁, thence through conductor 80 to normally closed relay contacts CR-8₁, and continuing through conductor 82 to relay coil CR-3, terminating in main line 2. Conductor 84, connected to main line 4, extends to a pair of normally open contacts CR-7₁, which are in turn connected through line 86 to relay coil CR-4, which terminates at main line 2. Conductor 88 extends from main line 4 to a cam actuated switch 90, connected in turn through conductor 92 to relay contacts CR-10₁, and thence through line 94 to relay coil CR-5, terminating in main line 2. In shunt relation around contacts CR-10₁ is a spring biased push button switch 96 for shorting out this pair of contacts when desired, the object of this switch being to "inch" the table or move it slowly.

Conductor 97, connected to main line 4, extends to a normally open spring biased switch 98 of the so-called "microswitch" variety, which remains open unless pressure is maintained thereon to keep it closed. The opposite terminal of this switch is connected through line 100 to relay coil CR-6, the opposite terminal of which extends to a pair of normally closed contacts CR-8₁, and thence to main line 2. A set of normally open contacts CR-2₂ are provided in shunt relation around the microswitch 98 and a second pair of normally open contacts CR-6₂ are also connected in parallel therewith. Line 102, connected commonly to line 100 and one side of contacts CR-2₂ and CR-6₂, extends to primary 104 of transformer 106, and thence connected to a second primary 108 of transformer 110 in series therewith, the latter terminating at main line 4. Secondaries 111 and 112 of transformers 106 and 110 respectively, are also connected in series and thence to a resistance-capacity circuit including resistor 114 and variable capacity 116 in parallel, the opposite end of which is grounded, one terminal of secondary 111 being connected through line 118 to the control grid 120 of triode 122. Primary 124 of transformer 126 is interconnected between line 102 and one end of control relay CR-6. The plate 128 of tube 122 is directly connected to secondary 130 of transformer 126 and thence through control relay coil CR-7 to ground, a capacitor 132 being placed in shunt relation around said coil. Conductor 134 extends from a common point between primaries 104 and 108 to main line 2.

Conductor 136, connected to main line 4, is likewise connected to a pair of normally open contacts CR-7₂, the opposite side of which is connected through line 138 to primary 140 of transformer 142, the opposite side of the transformer primary being connected directly through line 144 to main line 2. Two transformers 146 and 148, having their primaries 150 and 152 connected in series between lines 4 and 138, likewise have their secondaries 154 and 156 connected in series between an RC time circuit consisting of resistance 158 and variable capacitance 160 in parallel and control grid 162 of triode 164. Plate 166 of tube 164 is connected through conductor 168 and secondary 170 of transformer 142 to relay coil CR-8, the opposite terminal of which is grounded. Condenser 172 is connected in shunt around relay coil CR-8. Conductor 174 interconnects the intermediate point between the primaries 150 and 152 and main line 2.

Conductor 176 interconnects main line 4 with a set of normally open relay contacts CR-8₂, which are in like manner connected through line 178 to primary 180 of transformer 182, the opposite terminal of which is connected through line 184 with main line 2. Two transformers 186 and 188, having their primary coils 190 and 192 connected in series between lines 178 and 4 likewise have their secondaries 194 and 196 connected in series between an RC circuit consisting of resistance 198 and variable capacitor 200 in parallel and the control grid 202 of tube 204. The plate 206 of said tube 204 is connected through line 208 to secondary 210 of transformer 182 and thence through line 212 to control relay CR-9 and to ground. A condenser 214 is connected in shunt across said relay coil CR-9. Line 216 is connected from a point intermediate the two primaries 190 and 192 to main line 2. Connected directly across lines 2 and 4 is primary 218 of transformer 220, secondary 222 of which provides a source of power for the heater filaments of the various tubes in the control system.

Referring now more specifically to Figure 2, while the circuit connections are discontinuous between Figure 1 and Figure 2, there is a cross-relationship in that certain of the operating coils shown in Figure 1 control contacts in Figure 2 and vice versa. There is shown at the top of this figure a driving motor 224 which is adapted to drive the body which is being welded relative to the welding head. This motor may be any one of a plurality of conventional driving motors and is supplied by power over a three-phase power line 226, and controlled by a series of contacts $CR-5_1$, $CR-5_2$, $CR-5_3$, in each line, which are controlled, of course, by relay CR-5. When these contacts are closed, the motor is operative to move the parts being welded. A 115 volt D. C. exciter armature is shown at 228, which provides control voltages to lines 230 and 232. The exciter is provided with a field coil 233 connected across the armature. Connected across the control busses 230 and 232 is a field coil 234 of a small motor to feed the weld wire or rod with respect to the work. The armature 236 of this motor is also shown within the dotted outline indicating the wire feed motor, and is itself connected in a circuit to be described.

The welder is shown at 238 and is connected to two main lines 240 and 242. Connected in shunt with the welder are a pair of normally closed contacts $CR-12_1$, a relay operating coil CR-12, and a pair of normally open contacts $MR-1$, which are controlled by the main relay MR, all three of these elements being connected in series in said shunt circuit. The main lines 240 and 242 which are connected to the welder extend to the weld wire or rod and work to provide the arc for welding which is indicated at point 244. A shunt 246 is provided in line 240 across which an ammeter 248 is connected to indicate the current flow. In like manner a voltmeter 250 is connected across the arc to read instantaneous voltages. A conductor 252 is connected to line 242 and extends directly to armature 236 of the wire feed motor. The opposite terminal of said armature is connected through line 254 to a pair of normally closed relay contacts $CR-8_1$. These relay contacts are likewise connected through line 256 to armature 258 of a driven control exciter, the opposite terminal of which is connected through line 260 to manually movable switch arm 262 of one of the main switches. This arm 262 is adapted to contact three stationary contacts 264, 266 and 268. Contact 264 is connected first to a variable tapped resistor 270, secondly to a pair of normally open relay contacts $CR-3_1$ and to one terminal of a manual push button switch 272. The opposite terminal of the resistor 270 is directly connected to one of the relay contacts $CR-3_1$, to normally open relay contacts $CR-13_1$, and to normally open relay contact $CR-12_2$. The opposite terminals of each of the last two mentioned sets of contacts are directly connected through conductive line 274 to the shunt 246 and likewise through resistor 276 to the push button switch 272. Center contact 266 is unconnected and stationary contact 268 is directly connected through conductor 278 to armature 236.

Arm 262 is one part of a multi-position multi-arm main switch having two other movable blades or contactors 280 and 282, which move simultaneously therewith. When this combination switch is moved to its upper position, as shown in Figure 2, the device is in position to weld and the welding wire (electrode) can be moved down. When in its center position, the device is deenergized, and when in its lower position, the welding wire raises up, all of which will be later explained in more detail. Arm 280 of this combined switch engages two contacts which are merely dummies, as they are not connected with any part of the apparatus. The third contact 284, however, has a conductive line 286 connected thereto which extends to a variable resistor 288, which is also connected directly to control buss 232. It also extends to a pair of normally open relay contacts $CR-3_2$, which are in turn serially connected with a pair of normally open relay contacts $MR_2$, and thence to main control buss 230. The excited field 290 is connected between control buss 232 and a variable adjuster tap 292 which engages the resistance 288. The third switch arm 282, connected through line 281 to buss 230, also engages three contacts, only one of which is connected into the circuit. That one, 294, is connected through line 296 to a manually operable switch 298, which is mechanically connected to and operates with main switch 16, and thence through line 300 to a normally closed microswitch 302, which is cam operated, and further serially through normally closed emergency stop switch 304. Conductor 306 then extends from switch 304 to a pair of normally open relay contacts $TDR-1_1$, which are operated by the time delay relay. Also connected to contacts $TDR-1_1$, through conductive line 308, are a pair of normally open relay contacts $CR-3_3$. Conductor 310 likewise connects contacts $CR-3_3$ to a relay coil FR of the field relay, the other terminal of which is connected to the control buss 232.

The main relay coil MR, having in series therewith a resistor 309, is connected in shunt around field relay FR and relay contact $CR-3_3$ in series. In like manner relay coil CR-10 is connected in shunt around the main relay coil MR. Relay coil CR-12 is connected in shunt around relay coil FR. Relay coil TDR-1 is directly connected to control buss 232 and thence to a manual push button switch 312, the opposite terminal of which is conductively connected to line 306. Relay coil CR-11 is connected to main control buss 232 and thence through conductive line 314 to one side of the push button switch 312, to a pair of normally open relay contacts $CR-11_1$, the opposite side of which is also connected to line 306 and which, of course, act as holding contacts, and to one side of a pair of normally open contacts $CR-6_3$. The opposite terminal of contact $CR-6_3$ is connected through a switch 316 to line 306. A switch 317 in parallel with switch 298 is mechanically a part of switch 316, as indicated by the dotted line, and moves together therewith as a double pole, double throw switch, closing one section and opening the other simultaneously.

Conductor 318 is connected to control buss 232 and extends to resistor 320, which is serially connected to a variable resistor 322, which is connected in series relation with a second fixed resistor 324 across to control buss 230. The welder field 326 is directly connected to control buss 232 and thence to a variable resistor 328, which is serially connected in turn to normally open relay contacts FR₁, which are again serially connected to a second variable resistor 330, having its opposite contact connected to the other control buss 230. A cross connection 332 extends from a point between resistor 328 and relay contacts FR₁ to a mid-point between resistor 320 and resistor 322.

In general it is emphasized that the control system is provided to produce a series of intermittent spaced welds between two parts to be secured together or what might be termed "skip" welding. The particular configuration of the junction line between the parts may take any desired form; the only design necessary is that in automatic welding the welding head must follow along the seam. After the welding electrode is brought into proximity to the work at the starting point, one complete cycle of the system consists in:

1. Welding current is applied and motion between the work and electrode is started which relative motion is maintained throughout the complete work period. The welding time is maintained to produce a specified length of weld between the parts and during this time the weld rod is continuously fed toward the work and the flux is fed down to submerge the arc.

2. The feed for the weld rod is stopped but the welding current is left on. This provides current to burn off the end of the weld rod as the work moves along and produces a clean break at the end of that particular weld, and spaces the end of the rod from the work so that it will not strike the work intermediate the weld areas.

3. Weld current is cut off.

4. A time delay period is provided to: (a) Enable the voltage supply for the feed motor to decay and approach as nearly as possible the stable voltage; and (b) To hold the wire spaced from the work until just prior to the next sequential weld.

5. Weld rod feed is energized to bring the weld rod down slowly into engagement with the work again after which engagement is moves over the work for a short distance before the next application of welding current and a repetition of the same cycle.

These cycles are repeated until the complete distance over which these skip welds are to be applied has been covered and then the whole system is deenergized.

With this general description of the operation in mind, reference will now be made specifically to the system for carrying out the same. It will be noted from the above general description that there are several different time intervals that have to be determined and set prior to operation. These are:

1. The length of time the weld current shall remain on.

2. The burn off time or that time during which the weld rod feed is stopped but the weld current is maintained on.

3. The delay time which determines the time period between the cessation of welding current and the initiation of weld rod feed for the next weld.

The adjustable control circuits for all three are shown on the lower half of Figure 1.

The time control circuit for the first of these time intervals is formed by variable capacity 116 in circuit with resistor 114 to form an adjustable RC circuit for controlling tube 122 in whose output circuit is control relay CR-7. Thus, by adjusting capacitor 116, the length of time the weld current is on may be varied. The time circuit for "burn off" time is formed of variable capacitor 160, resistor 158, tube 164 and control relay CR-8, and the time circuit for the delay period prior to renewing the feed wire drive is formed of variable capacity 200, resistor 198, tube 204 and control relay CR-9. Therefore, before any operation of the system as a whole, each of these timer circuits must be adjusted by setting the capacitors 116, 160 and 200 to determine the proper time interval for each of these periods.

Switch 316—317 is a double-pole, double-throw switch that is used to adapt the circuit to either cam or overall timer operation, one portion of the switch being open when the other is closed. For cam operation 317 is closed and 316 open; for overall timer operation 317 is open and 316 is closed. Assuming that the work is in position and that the welding head is now located over the point at which it is desired to begin, the multi-arm switch having arms 262, 280 and 282 is moved to the upper or weld position. Manual switch 272 is closed to cause the weld rod or wire to feed slowly toward the work. This wire feed motor 234—236 has its field 234 connected directly across the exciter 228, and, assuming that the three pole control switch 262, 280, 282 is in its uppermost position, a circuit to the armature 236 of the wire feed motor may be completed as follows: welding supply line 242, line 252, armature 236, line 254, normally closed contacts CR-4₁, line 256, armature 258 of the control exciter motor, line 260, switch 262—264, manually operable "inch" switch 272, resistor 276, line 274 to one side of shunt 246 in supply line 248. The direction and speed of the wire feed motor is determined by the voltage generated by exciter 258 and the voltage across the arc 244. The voltage of the exciter 258 is, of course, adjustable through movement of arm 292. The voltage of the arc is opposed to the voltage of the exciter 258, and when the arc voltage is greater, the wire feed motor will feed the wire toward the work. Conversely, if the exciter voltage exceeds the arc voltage, then the wire motor reverses and moves the wire back away from the work. A balance between the voltages occurs at a proper distance for welding, and as the wire burns away, tending to increase the distance and the arc voltage, this voltage increase will affect the drive to bring the wire down to the same distance. At one phase of the cycle the effect of the voltage difference may, of course, be modified or reduced by the introduction of resistance into the control circuit to slow down the speed and this is accomplished by the introduction or removal of resistance 270.

With the exciter 228—233 operating, there is some voltage applied to the welder field coils through resistors 322, 324 and 328, which produces some voltage across the arc gap sufficient to energize the wire feed motor but not enough to weld. This voltage, since it exceeds the exciter voltage 258, causes the wire motor to be energized by holding down switch 272 and the welding wire is brought down into contact with the work. This push button shorts out the control relay contacts $CR-12_2$ and $CR-13_1$, as well as wire speed control potentiometer 270 through whose setting the speed of wire feed during subsequent automatic wire inching operations is determined.

The main switch 16—298 is now closed, which completes the circuit to the overall timer 18, which closes its contacts 74 to time the complete operation. The closure of contacts 74 energizes the grid unblocking transformer 36 by completing a circuit from power line 4, line 38, primary 34, line 32, line 70, normally closed contacts $CR-1_1$, line 72, contacts 74, line 76 to power line 2. Tube 52 and its associated circuit forms a fourth timer circuit, which may be identified as the "interval" timer, and by this is intended the total time for one weld cycle including delay spacing time; in other words, from the beginning of one weld to the beginning of the next in order. Upon the energization of transformer 36, which blocks or bucks transformer 42, which has been blocking tube 52, the grid circuit to tube 52 is opened and the RC time circuit 58—56 will now control the tube. After the time period determined by this RC circuit, the tube 52 will conduct and this energizes relay CR-2 through an obvious plate circuit. The energization of coil CR-2 causes the closure of its contacts $CR-2_1$ and $CR-2_2$. The closure of the first set of contacts completes an obvious circuit through relay coil CR-1 to energize the same. This opens the normally closed contacts $CR-1_1$, and in so doing again breaks the circuit to the primary 34 of the grid unblocking transformer 36, thus allowing transformer 42 to block tube 52 and again deenergize coil CR-2. When this occurs, its contacts $CR-2_1$ again open to complete the cycle and deenergize relay coil CR-1. The interval timer, therefore, acts automatically to energize relay coil CR-2 at regular intervals as long as the overall timer 18 maintains its contacts 74 closed.

When relay coil CR-2 was energized, as well as closing contacts $CR-2_1$, to provide the above operation, it simultaneously closed contacts $CR-2_2$, which completes an obvious circuit through relay coil CR-6 and normally closed contacts $CR-9_1$. Upon energization of relay coil CR-6, contacts $CR-6_2$ complete a holding circuit to maintain it in circuit and locks the coil in. It also closes a set of contacts $CR-6_3$, which completes energizing circuits for coils TDR-1 and CR-11, since switch 316 is closed. Relay coil CR-11 closes hold-in contacts $CR-11_1$, which locks in both CR-11 and TDR-1, and simultaneously closes $CR-11_2$, which completes a circuit to the flux hopper valve and energizes the same to feed flux to the weld area. After a short interval, relay coil TDR-1 pulls in to close contacts $TDR-1_1$ and completes a circuit through the main relay coil MR. This circuit through the main relay may be traced as follows: line 230, line 281, switch 282—294, line 296, switch 298 or 317 (switch 298 if the overall timer is being used or switch 317 if the cam timer is used), line 300, switch 302, which is a normally closed cam actuated switch, switch 304, which is an emergency stop switch, line 306, contacts TDR-1, line 308, resistance 309, MR relay coil and main line 232.

Turning back for a moment to the last set of contacts operated by relay coil CR-6, its energization lastly closes contacts $CR-6_1$, which completes an energizing circuit for relay coil CR-3. The energization of relay coil CR-3 in turn actuates a plurality of contacts. The closure of contacts $CR-3_2$ thereby completes a circuit through the exciter field coil 290 since contacts $MR_2$ in series therewith have been closed by the energization of the main relay. In like manner the closure of contacts $CR-3_3$ causes the field relay FR and relay coil CR-12 in parallel therewith to become energized and the closure of contacts $CR-3_1$ shorts out the wire feed speed control 270. The closure of contacts $FR_1$ by energization of coil FR shunts out field resistors 322, and 324 inserting adjustable resistance 330 in parallel therewith to place the full exciter voltage across the welder field 326 and the control rheostat 328. Simultaneously the closure of contacts $CR-12_2$ complete a circuit to the wire feed motor as follows: line 274, contacts $CR-12_2$, contacts $CR-3_1$ (previously closed), switch 264—262, line 260, armature 258, line 256, normally closed contacts $CR-4_1$, line 254, armature 236, and line 252. This applies full wire feed speed, since variable resistor 270 is not now in the control circuit and this speed and direction are controlled by the arc voltage as explained. Contacts $CR-12_1$ are normally closed and upon energization of the relay open to break the circuit through relay coil CR-13 and keep it from being damaged by the welding voltages.

In order to move the work relative to the welding head, two relays CR-5 and CR-10 are provided. While the character of such motion may be any desired, rotary motion has here been referred as exemplary and therefore motor 224 is described as turning a turntable, though it may also be used to provide any other motion. This motor is energized when relay CR-5 is energized, which closes contacts $CR-5_1$, $CR-5_2$ and $CR-5_3$. Relay CR-5 is in turn controlled by either relay CR-10 or by a manual switch 96, which is in parallel with contacts $CR-10_1$. In the circuit controlling relay CR-5 there is a switch 90, which is a toggle switch mounted in the control panel, which, when it is open, deenergizes the motor 224 completely when its use is not desired.

At this point, therefore, the table is moving to move the work past the end of the weld rod or wire, full welding current is on, the wire or rod feed is energized to feed the wire toward the work, flux is being fed down on the arc section to submerge the same, and the whole sequence is being timed by control circuits.

The time control circuit for the weld time period is that associated with tube 122 and includes the RC time circuit 114—116 and relay CR-7. This circuit is permitted to go into action by the energization of unblocking transformer 106. The circuit to primary 104 of this transformer may be completed either through contacts $CR-6_2$ or $CR-2_2$, as is obvious from Fig. 1. Referring to the preceding description, it will be recalled that relay CR-2 is energized for only a short time, which would initially energize the primary 104. However, it also completes the circuit of relay coil CR-6, which closes its hold-in contacts $CR-6_2$, and this maintains the transformer circuit complete as long as they are closed and $CR-2_2$ may drop out. The work, therefore, proceeds past the weld wire and the weld continues for a time predetermined by the values of resistance 114 and adjusted condenser 116. At the end of that time the tube unblocks and conducts energizing relay CR-7 in the plate circuit through an obvious circuit. Coil CR-7 closes two sets of contacts, first CR-7₁, which energizes relay coil CR-4, which in turn opens normally closed contacts CR-4₁ to open the motor armature circuit of the wire feed motor to stop any further feed of the same, and second, contacts CR-7₂, whose closure energizes grid unblocking transformer 148 of the "burn off" timer circuit of tube 164 to start that circuit.

At this point the table is still moving, the wire feed with respect to the table and work has stopped, but the welding current remains on to burn off the end of the wire sufficiently far enough back to make a clean end, prevent dribbling of particles, and also any scraping of the end on the work over that area that it is desired to skip.

After a time period determined by the RC circuit 158—160, tube 164 unblocks and conducts, which energizes relay CR-8 in the plate circuit thereof. Normally closed contacts CR-8₁ are opened by the energization of CR-8, which deenergizes relay coil CR-3, this in turn opens contacts CR-3₂, which breaks the circuit to the control exciter field directly and also opens contacts CR-3₃, which deenergizes relay coil FR, which causes contacts FR₁ to open and reinsert resistance into the welder field circuit. This drops the voltage across the arc to a low value, depending upon the value of the resistors. Relay CR-12, in parallel with relay FR, is likewise deenergized by the opening of relay CR-3₃ and this allows normally closed contacts CR-12₁ to close and again energize relay CR-13.

The energization of relay coil CR-8 also closes contacts CR-8₂ to energize unblocking transformer 188 for tube 204. After a suitable delay as determined by RC circuit 198—200, the tube 204 will conduct and cause energization of relay coil CR-9 in the plate circuit of tube 204. This time delay circuit is incorporated to provide a time delay in again feeding the wire toward the work for the next weld. When CR-9 becomes energized it opens normally closed contacts CR-9₁, which results in opening the circuit for relay coil CR-6. The deenergization of CR-6 starts a chain of sequential operations which deenergizes tubes 122, 164 and 204 in order. The opening of contacts CR-6₂ deenergizes unblocking transformer 106 and tube 122 ceases to conduct, deenergizing relay CR-7. In like manner the opening of contacts CR-7₂ causes tube 164 to block and relay CR-8 to become deenergized. The same sequence of events follows for the last time delay circuit in which tube 204 becomes nonconductive and relay coil CR-9 drops out, which closes again normally closed contacts CR-9₁ to place the system in condition to repeat the whole cycle.

The deenergization of relay coil CR-7 also opens contacts CR-7₁ which cause relay coil CR-4 to become deenergized and normally closed contacts CR-4₁ again close, completing the circuit for the armature of the wire feed motor as previously traced, except that it now is through contacts CR-13₁ which are closed due to the energization of coil CR-13 when relay CR-12 was deenergized. The wire will then start to feed down until it contacts the work, the speed with which it moves being determined by the setting on wire speed control potentiometer 270. Upon contact of the wire with the work the voltage drop across the welder will go to approximately zero and since the relay coil CR-13 is dependent on this voltage, it will drop out, opening the wire feed armature circuit at CR-13₁, as just indicated, and the feed will stop. Relay CR-13 is adjusted to open at a low voltage, such for example as 4 volts, so that it will still drop out even if poor contact is made, and thus prevent inching down of the wire, which might result in increasing the pressure of the wire against the work to a point beyond optimum arc initiating condition.

In order to more clearly describe the operation of the wire feed as controlled by the wire feed motor, there is included Figure 3, which is an oscillograph of the wire motor armature voltage through the welding cycle and the arc voltage taken simultaneously therewith on a double recorder. The curves shown in this figure are reproductions of actual curves run on the equipment. The various time intervals have been identified at the bottom of the figure and it will be noted that the datum lines are curved to accommodate the double pen recorder, and while some points may not appear to be in the same vertical alignment to indicate the same time instant, it will be found that they are the same distance from the curved vertical line and therefore occur at the same time.

At point A the wire is in close proximity to the work having been fed to that location at the end of the previous cycle and the full weld power is applied. The arc voltage is low as compared to the voltage of exciter 258 and the first result is that the motor armature voltage is reversed and the wire backs away from the work as shown by the downward peak 400 on the upper curve. The arc voltage rises to balance the exciter voltage and reaches a substantially constant value as shown on that portion 402 of the lower curve and at point B the motor armature circuit is broken by the opening of contacts CR-4, and the upper voltage curve decays to point C. This is the "burn-off" time and the welding power remains on, which increases the arc voltage to a peak 404. At this point C with the arc voltage high if the circuit to the wire motor armature was immediately closed a high voltage would be applied to the motor armature to feed the wire toward the work and the speed would be so great that the end of the wire would hit the work and probably buckle or bend. Therefore, a short delay time is provided from C to D before the circuit of the motor armature is again closed, and it will be noted that by point D the arc voltage has decreased considerably along the line of decay following cutting off the main welding power. From point D on the arc voltage decays away until the next cycle.

At point D, however, the motor armature circuit is closed to feed the wire again down toward the work, and the armature voltage is shown as increasing to the right of point D. When the wire reaches a point at which the low voltage still across the arc has dropped to say four volts, relay CR-13 drops out opening contacts CR-13₁ and the wire feed circuit is disabled until the beginning of the next cycle at point A. The speed at which the wire is fed during the time period following point D is dependent upon the setting of the potentiometer 270. This potentiometer is not in the control circuit during the weld period, as contacts CR-3₁ and CR-12₂ are closed to shunt the same.

By the present design two difficulties in the manipulation and handling of the wire rod feed have been eliminated. The first of these was the sticking or freezing of the electrode or wire when starting the arc while traveling. The reasons for this difficulty are, too heavy pressure of the rod or wire against the work so that the arc will not start and the electrode freezes to the work or that small irregularities on the end of the electrode from the last weld make striking the arc difficult. By again referring to Figure 3, it is noted that at point 404 the arc voltage is high and if the armature is connected into the circuit at this point the motor will acquire such speed that the wire will hit the surface of the work with sufficient force to buckle the same rather than stop at its proper place for the next weld. The delay time was therefore incorporated in the control circuit to permit the arc voltage to drop from point C to D, at which point the applied voltage will be proper to feed the wire toward the work at a reasonable speed. When the wire just makes contact with the surface of the work, it should stop, and this is accomplished by causing relay CR-13 to drop out when the voltage between the wire and work falls to a predetermined value; as an example, it was found that if this relay dropped out at 4 volts the operation was satisfactory. The utilization of the burn-off of the end of the wire left a smooth rounded end, which overcame the second reason for sticking at the start of the weld.

The second of the difficulties mentioned above that was overcome by this system is the sticking, freezing or dragging of the weld rod or wire at the end of each weld. This was overcome by the inclusion of a period within which the wire feed is stopped but during which the welding current remains on so that the end of the wire will burn back before the welding current is discontinued. This leaves a smooth rounded end on the wire spaced from the work so that it will not drag over it and prevent the wire end from being trapped by the molten metal when the welding current is cut off.

The system has now completed one weld along the junction area, has moved over a skip area, and has been readjusted to start again on a new weld. This next weld is triggered off by the interval timer circuit associated with tube 52, which as previously mentioned automatically operates at regular intervals as long as the overall timer 18 is energized, each interval being of sufficient length to permit a weld area and spacing to take place. Assuming, therefore, that the proper time has passed, then the interval timer tube 52 will now conduct and relay CR-2 will close its contacts CR-2₂ to energize the relay CR-6 and the whole cycle described above will be again repeated, and this will take place for as many individual welds as are desired. When the total line or distance has been covered, then the overall timer will operate to open its contacts 74, which deenergizes the interval timer so that it will no longer be operative, and thus shut down the whole system. It will be obvious that if the overall timer becomes deenergized during part of the sequence of operation, the system will complete its part cycle and clear, stopping when all is in readiness for a new cycle. When the on-off switch 16 is opened, the overall timer 18 is reset for a new timing operation, and since switch 298 forms a part of and is mechanically connected to and moves with switch 16, that opens also to deenergize relay coils TDR-1 and CR-11. This closes the flux air valve 10—12 and stops the flow of flux to the part. At this point it is also desirable to move the wire back up out of the way so that the part welded may be taken from the machine. The multi-arm switch 262, 280, 282 is moved to its lower position, which is labelled "up," and this places armature 236 directly across the exciter armature 258 through an obvious circuit and so the former runs at full speed to retract the wire as long as the switch is left closed in this position. The part that has been welded may now be removed from the machine and another new one to be welded may be placed thereon and the system again started.

Instead of having the sequence of events controlled by interval and sequence timers 52 and 18, the system may as easily be controlled by cam operated switches actuated by movement of the work carrying support itself. The two switches which initiate and stop the cycle in this case will be micro-switches 98 and 302, the first of which it will be seen is in shunt to switch CR-2₂ and, therefore, makes the operation of CR-2 unnecessary. The spacing of cams which momentarily close microswitch 98 determine the interval time. Cam operated switch 302 cuts the whole system off at the completion of the welding on a given part. The switch 317 should be closed and switch 316 open at the beginning of the welding process if cam switches are to be used, and switch 298—16 should be open. Push button 304 is merely an emergency stop switch and deenergizes the system completely on operation.

We claim:

1. In welding means for producing a plurality of spaced welds between parts to be secured together, a supply of weld rod, means for feeding the weld rod toward the parts, means for moving said parts continuously past the rod, means for intermittently applying welding current to the rod, timing control means to deenergize the weld rod feeding means prior to the cessation of welding current, a second timing control means to delay reenergization of the rod feeding means for a predetermined time after the weld current has ceased to flow, and control means to cause said rod feeding means to operate at a lower than normal speed to cause the rod to approach the parts prior to the termination of the interval in which the welding current is not applied to the rod.

2. In welding means for producing a plurality of spaced welds between parts to be secured together, a supply of weld rod, means for feeding the weld rod toward the parts, means for moving said parts continuously past the rod, control means for periodically applying welding current to the rod, timing control means for the weld rod feed to deenergize the feeding means prior to discontinuance of the main welding current, and a second timing control means for the weld rod feed to delay reenergization of the same for a predetermined period after discontinuance of the weld current but apply it prior to re-application of the welding current.

3. In welding means for producing a plurality of spaced welds between parts to be secured together, a supply of weld rod, means for feeding the weld rod toward the parts, means for moving said parts continuously past the rod, control means for periodically applying welding current to the rod, timing control means for the weld rod feed to deenergize the feeding means prior to discontinuance of the main welding current, a second timing control means for the weld rod feed to delay reenergization of the same for a predetermined period after discontinuance of the weld current, and means to again deenergize the weld rod feeding means when the arc voltage falls to a predetermined value prior to the next successive weld.

4. A method for securing together parts by a plurality of spaced intermittent welds utilizing a weld rod fed toward the parts including the steps of feeding the rod until it contacts the parts, applying welding voltage to the rod to produce an arc, continuously moving the parts with respect to the rod, stopping the feed of the rod a predetermined time prior to the cessation of the welding voltage to allow the rod to burn off and provide a space between the rod end and the parts so that it will not engage the parts during that period that it moves thereover and no welding voltage is applied, delaying any feeding of the weld rod toward the parts for a predetermined time and then feeding the rod toward the parts at a lower than normal speed until engagement is made prior to the next application of welding power.

5. In welding means for securing parts together, a weld rod, means for automatically feeding said rod toward the parts, means to move the parts with respect to the weld rod and a plurality of interlocked timing and control circuits for intermittently applying welding voltage to the rod, feeding and stopping the rod to produce a series of spaced welds between the parts, said application of power to the rod interval extending into said interval for stopping of weld rod feed, delaying again feeding the rod after the breaking of the welding voltage for a predetermined interval and providing a predetermined time following the feeding down of the rod before reapplication of welding voltage.

6. In welding means for securing parts together, a weld rod, means for automatically feeding said rod toward the parts, means to move the parts with respect to the weld rod and a plurality of interlocked timing and control circuits for intermittently applying welding voltage to the rod, feeding and stopping the rod to produce a series of spaced welds between the parts, said application of voltage to the rod interval extending into said interval for stopping of weld rod feed, delaying again feeding the rod after the breaking of the welding voltage for a predetermined interval, feeding the rod toward the parts at a predefined lower than normal speed and providing a predetermined time following the feeding down of the rod before reapplication of welding voltage.

7. In welding means to secure parts together along a common junction line by a series of spaced welds, a supply of welding rod, means to move the parts continuously past the welding rod, means for feeding said welding rod toward the parts, a supply of welding current, switching means and control circuits interconnecting said supply rod, means for feeding the rod and the parts, timing means to initiate each of a plurality of successive weld cycles, a second timing means controlled by the first to apply welding current to the weld rod and parts for a prescribed time, a third timing means to deenergize the weld rod feeding means prior to the opening of the welding circuit and controlled by the second timing means and a fourth timing means to provide a delay before reenergization of the rod feeding means and controlled by the third timing means.

8. In welding means to secure parts together along a common junction line by a series of spaced welds, a supply of welding rod, means to move the parts continuously past the welding rod, means for feeding said welding rod toward the parts, a supply of welding current, switching means and control circuits interconnecting said supply rod, means for feeding the rod and the parts and a plurality of sequential timing circuits each controlling the next in order connected to the control circuits to initiate a welding cycle, energize the welding circuit, deenergize the means for feeding the welding rod, and provide a delay following cessation of the welding current before a reenergization of the weld rod feeding means in order for each of the spaced welds.

9. In welding means to secure parts together along a common junction line by a series of spaced welds, a supply of welding rod, means to move the parts continuously past the welding rod, means to feed said welding rod toward the parts, a source of power, an adjustable timing control means interconnecting said source, rod, parts and the means for feeding the rod to control the length of the periods for the feeding thereof, and a second adjustable timed control switching means to control the termination of the application of full welding current to the rod and parts and to interrupt the same, said second timing means being triggered by said first to provide an adjustable burn-off interval.

10. In welding means to secure parts together along a common junction line by a series of spaced welds, a supply of welding rod, means to move the parts continuously past the welding rod, means to feed said welding rod toward the parts, a source of power, an adjustable timing control means interconnecting said source, rod, parts and the means for feeding the rod to control the length of the periods for the feeding thereof, a second adjustable timed control switching means to control the termination of the application of full welding current to the rod and parts and to interrupt the same, said second timing means being triggered by said first to provide an adjustable burn-off interval, and a third adjustable timing control means to control the reapplication of power to the weld rod feeding means triggered by the second timing means to provide a delay interval after the welding power is removed before the weld rod may again be fed.

11. In welding means to secure parts together along a common junction line by a series of spaced welds, a supply of welding rod, means to move the parts continuously past the welding rod, means to feed said welding rod toward the parts, a source of power, an adjustable timing control means interconnecting said source, rod, parts and the means for feeding the rod to control the length of the periods for the feeding thereof, a second adjustable timed control switching means to control the termination of the application of full welding current to the rod and parts and to interrupt the same, said second timing means being triggered by said first to provide an adjustable burn-off interval, a third adjustable timing control means to control the re-application of power to the weld rod feeding means triggered by the second timing means to provide a delay interval after the welding power is removed before the weld rod may again be fed and a main adjustable timer control system connected to the circuit to determine the complete time for one weld cycle, said main timer control initiating the operation of said first adjustable timing means and conditioned for energization by the third adjustable timing means so that a completion of the various portions of one welding cycle places the control system in condition to be re-cycled by the next master control pulse from the main timer.

12. In welding means for securing parts together, a weld rod, means for automatically feeding said rod toward the parts, means to move the parts continuously with respect to the weld rod and a plurality of interlocked timing and control circuits for intermittently applying welding voltage to the rod, feeding and stopping the rod to produce a series of spaced welds between the parts, delaying for a predetermined interval feeding the rod after breaking of the welding voltage supply, feeding the rod toward the parts at a lower than normal speed and providing a predetermined time period after the rod has reached a proper position with respect to the parts before reapplication of the welding voltage.

STUART M. SPICE.
WILLIAM F. WILLIAMS, Jr.
WILBUR E. MOEHRING.

References Cited in the file of this patent

UNITED STATES PATENTS

| Number | Name | Date |
|---|---|---|
| 1,233,883 | Kramer | July 17, 1917 |
| 1,508,738 | Whiting | Sept. 16, 1924 |
| 1,701,372 | Jefts | Feb. 5, 1929 |
| 1,831,343 | Caldwell | Nov. 10, 1931 |
| 2,183,473 | Burgett | Dec. 12, 1939 |
| 2,259,958 | Levy | Oct. 21, 1941 |
| 2,260,510 | Clapp | Oct. 28, 1941 |
| 2,460,990 | Kratz et al. | Feb. 8, 1949 |

FOREIGN PATENTS

| Number | Country | Date |
|---|---|---|
| 377,548 | Great Britain | July 28, 1932 |
| 660,632 | Germany | May 30, 1938 |